United States Patent [19]

Sano

[11] Patent Number: 5,191,252

[45] Date of Patent: Mar. 2, 1993

[54] DISPLACEMENT AMPLIFICATION MECHANISM USING PIEZOELECTRIC ELEMENT

[75] Inventor: Mitsunori Sano, Tokyo, Japan

[73] Assignee: NEC Corporation, Tokyo, Japan

[21] Appl. No.: 873,094

[22] Filed: Apr. 24, 1992

[30] Foreign Application Priority Data

Apr. 25, 1991 [JP] Japan ............................ 3-94608
May 17, 1991 [JP] Japan ............................ 3-112087

[51] Int. Cl.⁵ .................................... H01L 41/08
[52] U.S. Cl. ............................................ 310/328
[58] Field of Search ................ 310/323; 400/124; 101/93.04, 93.05

[56] References Cited

U.S. PATENT DOCUMENTS

| 4,675,568 | 6/1987 | Uchikawa et al. | 310/328 |
| 4,706,230 | 11/1987 | Inoue et al. | 310/328 X |
| 4,783,610 | 11/1988 | Asano | 310/328 |
| 4,874,980 | 10/1989 | Mine et al. | 310/328 |

Primary Examiner—Mark O. Budd
Attorney, Agent, or Firm—Burns, Doane, Swecker & Mathis

[57] ABSTRACT

The invention relates to a device using a leverage mechanism for amplifying a mechanical displacement produced by applying a voltage to a piezoelectric element. The device has a central support part, a pair of lever arms which are arranged oppositely and symmetrically with respect to a center axis of the support part and each connected to the support part by a hinge section, a piezoelectric element which has a longitudinal axis normal to the center axis of the support part and is fixed at two opposite ends to root ends of the two lever arms, respectively, and a resilient metal sheet beam which is fixed at its two oposite ends to the tip ends of two lever arms, respectively. A displacement of each end of the piezoelectric element is transmitted to the adjacent lever arm and amplified by lever action of each lever arm. As the amplified displacement is transmitted to the beam from the lever arms the beam makes a buckling motion, and a maximal displacement of the beam with respect to an end face of the support part becomes the output of the device. According to the invention a middle section of the beam is fixed to a protruding end of the support part, so that the device provides two simultaneous outputs one of which is a maximal displacement of the beam in a segment on one side of the fixed middle section and the other another maximal displacement in a segment on the opposite side of the middle section.

10 Claims, 3 Drawing Sheets

DISPLACEMENT AMPLIFICATION MECHANISM USING PIEZOELECTRIC ELEMENT

BACKGROUND OF THE INVENTION

This invention relates to a leverage mechanism for amplifying a mechanical displacement produced by applying a voltage to a piezoelectric element which is employed as a driving element.

It is known to produce a mechanical displacement by applying a voltage to a piezoelectric element and amplify the displacement by a leverage mechanism. A displacement amplification device of this mechanism is shown, for example, in U.S. Pat. Nos. 4,675,568 and 4,874,980.

The known displacement amplification device is an assembly of a piezoelectric element, a displacement amplifying metal member and a resilient metal beam. The amplifying metal member has a central support part and a pair of lever arms which are arranged oppositely and symmetrically with respect to a center axis of the metal member. Each of the two lever arms is connected to the support part by a thin-walled hinge section which becomes the fulcrum of the lever action. The longitudinal axis of the piezoelectric element is oriented perpendicular to the center axis of the amplifying metal member, and the two opposite ends of the piezoelectric element are bonded to the root end sections of the two lever arms, respectively. The beam is made of a resilient metal sheet, and at its two opposite ends the beam is fixed to the tip ends of the two lever arms.

When a driving voltage is applied to the piezoelectric element in the above device a longitudinal displacement of each end of the piezoelectric element is transmitted to the adjacent lever arm, and the lever arm makes lever action to amplify the displacement at its tip end. Since the amplified displacement is transmitted to the resilient beam fixed to the tip ends of the two lever arms, the beam makes a buckling motion. As a consequence there occurs a change in the distance between the center of the beam and an end of the support part of the amplifying metal member. This change in distance is a maximal displacement of the beam and is used as the output of the displacement amplification device.

It will be apparent that the above described displacement amplification device provides only one output. Therefore, if two simultaneous outputs are required it is necessary to use a parallel combination of two units of amplification mechanisms. Further, if it is required that the two outputs should be different in magnitude it is necessary to differently design the two units of amplification mechanism to be used in combination. Although two simultaneous outputs can be obtained by combining two units of amplification mechanisms the combined mechanisms inevitably become large in size, and the combination of the two sets of mechanisms entails a considerable rise in cost.

SUMMARY OF THE INVENTION

It is an object of the present invention to provide a displacement amplification device which functions on the same principle as the above described known displacement amplification device and provides two outputs which appear simultaneously and may be equal or different in magnitude.

The present invention provides a displacement amplification device, comprising a displacement amplifying member which has a center axis and comprises a central support part having two thin-walled hinge sections protruding symmetrically from two opposite sides with respect to the center axis and a pair of lever arms which are arranged oppositely and symmetrically with respect to the center axis and connected to the support part by the two hinge sections, respectively, such that each of the two hinge sections becomes the fulcrum of lever action of the adjacent lever arm, a piezoelectric element which changes its length in the direction of a longitudinal axis thereof by application of a voltage thereto and is arranged such that the longitudinal axis is normal to the center axis of the amplifying member and fixed at one end thereof to a root end of one of the two lever arms and at the opposite end to a root end of the other lever arm, and a beam which is made of a resilient metal sheet and is fixed at two opposite end sections thereof to tip ends of the two lever arms, respectively. According to the invention, the beam is further fixed at a middle section thereof to a protruding end of the support part of the amplifying member such that each of a first segment of the beam between the middle section and one of the two end sections and a second segment of the beam between the middle section and the opposite end section makes a buckling motion and consequently changes its distance from a reference end face of the support part of the amplifying member when a displacement of each end of the piezoelectric element is transmitted to the adjacent lever arm and amplified by lever action of the lever arm.

As will be understood from the above statement, a displacement amplification device according to the invention provides two simultaneously appearing outputs. According to the need it is possible to design this device so as to provide two equal outputs or two outputs different in magnitude.

A device according to the invention is very compact and low in manufacturing cost compared with a combination of two units of known displacement amplification mechanisms each of which provides only one output.

The invention includes a modification of the above stated displacement amplification device. That is, the piezoelectric element in the above stated device can be replaced by two piezoelectric elements of a half length which are arranged longitudinally in alignment. In the case of this modification the central support part of the displacement amplifying member is formed with a central holding part which protrudes on the center axis of the amplifying member from a base end of the support part so as to intervene between root end sections of the two lever arms. One of the two piezoelectric element is fixed at one end to the central holding part and at the opposite end to a root end of one of the two lever arms, and the other piezoelectric element is fixed at one end to the central holding part and at the opposite end to a root end of the other lever arm. In operation a driving voltage is applied to each of the two piezoelectric element.

In principle the function of the modified device is similar to that of the firstly stated device. However, the modified device has an advantage that a manufacturing error in the symmetry of the displacement amplifying member and consequential imbalance between the two outputs of the device can be compensated for by applying appropriately different voltages to the two piezoelectric elements, respectively.

DESCRIPTION OF THE PREFERRED EMBODIMENTS

Figure 1:
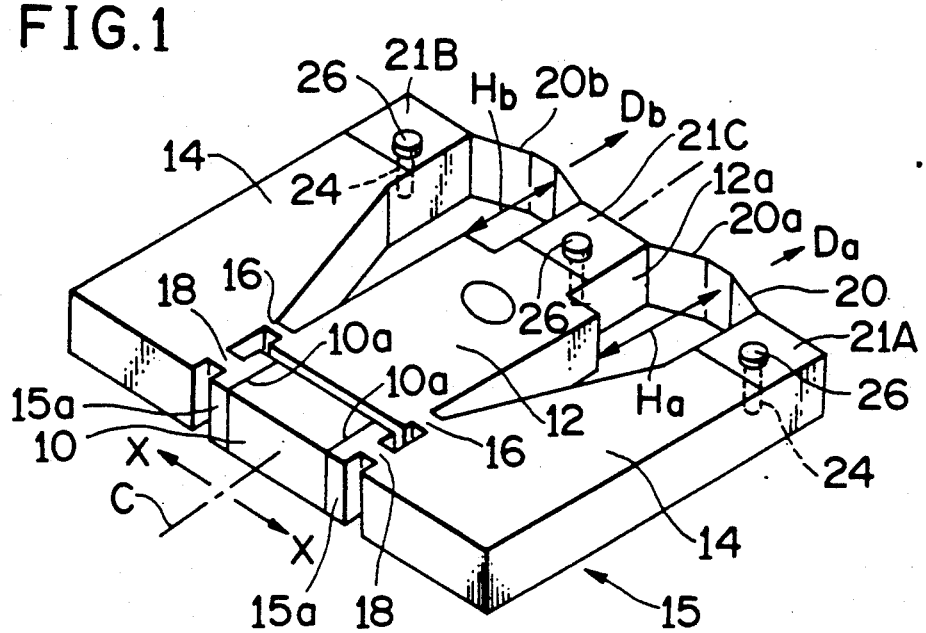
FIG. 1 is a perspective view of a displacement amplification device which is an embodiment of the invention.

FIG. 1 shows a displacement amplification device which is a first embodiment of the invention. Essentially this device is a combination of a piezoelectric element 10, a metal member 15 which holds the piezoelectric element 10 and amplifies a displacement of each of two opposite ends 10a of the piezoelectric element 10 and a beam 20 which is made of a thin and resilient metal sheet and attached to the metal member 15 in order to output the amplified displacement.

The piezoelectric element 10 is constructed by bonding a number of flat platelets of a piezoelectric ceramic together so as to utilize the longitudinal strain effect.

The displacement amplifying member 15, which is produced by precisely machining a metal plate usually by a wire-cut electro-discharge machining method, has a central support part 12 and a pair of lever arms 14 which are arranged oppositely and symmetrically with respect to a center axis C of the member 15. Each of the two lever arms 14 is connected to the support part 12 by a thin-walled hinge section 16. The member 15 has a cut to receive the piezoelectric element 10 such that the longitudinal axis of the piezoelectric element 10 becomes perpendicular to the center axis C of the member 15, and an end of each lever arm 14 is formed with a holding part 15a to which an end 10a of the piezoelectric element 10 is fixed. A thin-walled bridge section 18 is the joint between the holding part 15a and the major part of each lever arm 14. The piezoelectric element 10 is fixed at both ends 10a to the two holding parts 15a of the metal member 15 by application of a thermosetting resin adhesive.

To fix the beam 20 to the free end of each lever arm 14, the beam 20 has two parallel and laterally projecting clipping margins 21A at one end and another and similar two clipping margins 21B at the opposite end. The two clipping margins 21A fit on an end section of one lever arm 14, and the two clipping margins 21B fit on an end section of the other lever arm 14. A rivet hole 24 is formed in the end section of each lever arm 14, and each of the clipping margins 21A, 21B has a hole which can be brought into alignment with the rivet hole 24. Using these holes the clipping margins 21A, 21B of the beam 20 are respectively fastened to the two lever arms 14 by rivets 26. An oil press or the like is used to lock the rivets 26.

According to the invention the central support part 12 of the metal member 15 has a protruding end section 12a, and a middle section of the beam 20 has two parallel and laterally projecting clipping margins 21C which fit on the end section 12a of the support part 12. There is a rivet hole 24 in the end section 12a, and each of the clipping margins 21C of the beam 20 has a corresponding hole. Using these holes the clipping margins 21C are fastened to the end section 12a of the support part 12 by a rivet 26.

Thus, the beam 20 is fixed at its opposite ends to the free ends of the two lever arms 14 and, further, in its middle section to the end section 12a of the support part 12. A segment 20a of the beam 20 spans the gap between the end section 12a of the support part 12 and one lever arm 14, and another segment 20b of the beam 20 spans the gap between the end section 12a and the other lever arm 14. The arrow $H_a$ indicates the distance of the middle point of the segment 20a of the beam 20 from the support part 12, and the arrow $H_b$ the distance of the middle point of the segment 20b of the beam from the support part 12. Each of these distances $H_a$ and $H_b$ will be called a beam height. In this embodiment the distances $H_a$ and $H_b$ are equal to each other.

When an appropriate voltage is applied to the piezoelectric element 10 in FIG. 1 there occurs a displacement of each end 10a of the piezoelectric element 10 in the direction indicated by arrow X. The displacement of each end 10a is transmitted to the adjacent lever arm 14 via the bridge section 18, and each lever arm 14 makes lever action with the hinge section 16 as the fulcrum so that the displacement is amplified at the tip end of each lever arm 14. Naturally the amplified displacement is transmitted to the beam 20 in the direction longitudinal of the beam 20. That is, there occurs a displacement of each end of the beam 20. Since the middle section of the beam 20 is fixed to the support part 12 of the metal member 15, each of the two segments 20a and 20b of the beam 20 makes a buckling motion. Therefore, a maximal displacement $D_a$ of the beam 20 takes place at the middle point of the segment 20a, and simultaneously another maximal displacement $D_b$ of the beam takes place at the middle point of the segment 20b. That is, the displacement amplification device of FIG. 1 provides two outputs which appear simultaneously. When the application of the driving voltage to the piezoelectric element 10 is terminated each end 10a of the piezoelectric element reverts to its initial position whereby each lever arm 14 reverts to its initial state, and consequently the displacement of the beam 20 vanishes.

Figure 7:
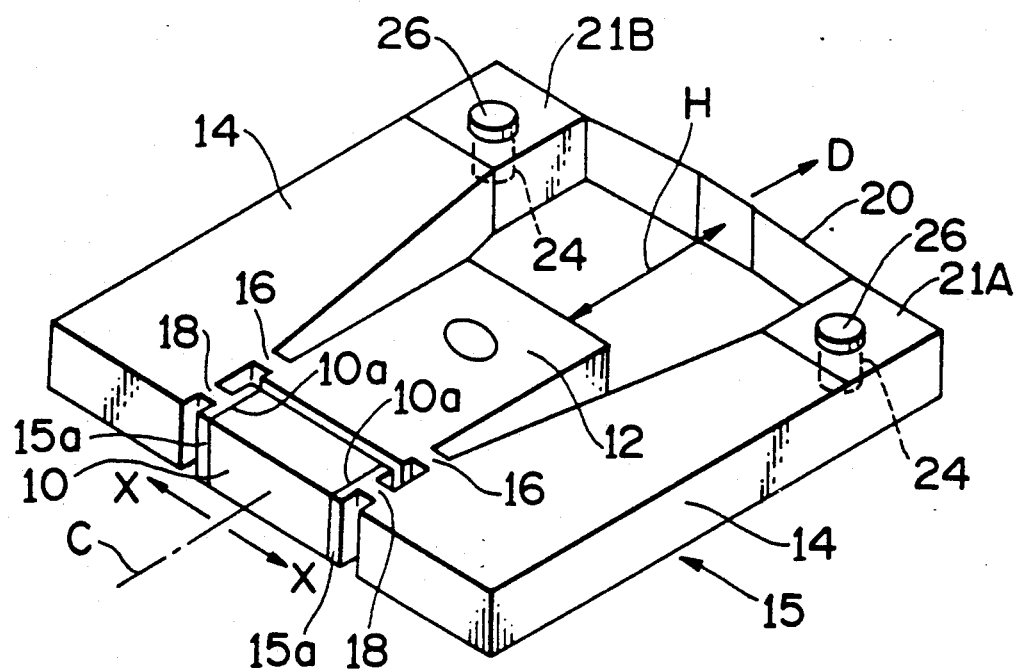
FIG. 7 is a perspective view of a known displacement amplification device for comparison with the device of FIG. 1.

For comparison, FIG. 7 shows a known displacement amplification device. This device is fundamentally similar to the device of FIG. 1 but differs in the manner of attaching the beam 20 to the amplifying metal member 15. The beam 20 in FIG. 7 has two clipping margins 21A and 21B at opposite ends, and by using these clipping margins 21A, 21B and rivets 26 the beam 20 is fixed to the end sections of the two lever arms 14 in the same manner as in the device of FIG. 1. However, the beam 20 in FIG. 7 is not fixed to the support part 12 of the metal member 15. Except for the two clipping margins 21A, 21B this beam 20 has no clipping or joining means, and the support part 12 of the metal member 15 is considerably shorter than the lever arms 14. Therefore, the beam 20 spans the gap between the end sections of the two lever arms 14, and the beam 20 is entirely spaced from the support part 12 of the metal member 15. In the mechanism of FIG. 7 the distance, indicated by arrow H, of a middle point of the beam 20 from the support part 12 is the beam height. When an appropriate voltage is applied to the piezoelectric element 10 the displacement of the ends 10a of the piezoelectric element in the direction X is amplified at the tip ends of the lever arms 14 and transmitted to the beam 20, whereby the entire section of the beam 20 between the two lever arms 14 makes a buckling motion. Therefore, a maximal displacement D of the beam 20 takes place at the middle point which is on the center axis C of the device. Thus, the displacement amplification device of FIG. 7 provides only one output.

A sample of the displacement amplification device was produced and tested. The material of the displacement amplifying metal member 15 was a 4 mm thick plate of 42Ni-Fe alloy of which the modulus of longitudinal elasticity was $14.8 \times 10^3$ kg/mm$^2$, and the Ni-Fe plate was formed into the metal member 15 by a wire-cut electro-discharge machining method. The metal member 15 was 35 mm in width and 30 mm in length. The piezoelectric element 10 was a stack of a number of platelets of a lead zirconium titanate ceramic. The piezoelectric element 10 was fixed to the holding parts 15a of the metal member 15 by using a thermosetting resin as adhesive. After curing the adhesive the piezoelectric element 10 was polarized under the usual polarizing conditions. After that the beam 20 was fixed to the end sections of the two lever arms 14 and the end section 12a of the support part 12 by using aluminum rivets 26. In this sample both the beam height $H_a$ and the beam height $H_b$ were 6.05 mm. When a DC voltage of 150 V was applied to the piezoelectric element 10 in the sample both the maximal displacement $D_a$ of the segment 20a of the beam 20 and the maximal displacement $D_b$ of the segment 20b of the beam were 0.15 mm.

In the case of the known displacement amplification device of FIG. 7, it is necessary to use a parallel combination of two devices of the same mechanisms to simultaneously obtain two outputs corresponding to the outputs $D_a$ and $D_b$ of the device of FIG. 1, and each device must have nearly the same dimensions as the device of FIG. 1. Therefore, the total volume of the combined two mechanisms becomes nearly two times as large as the volume of the device of FIG. 1.

Figure 2:
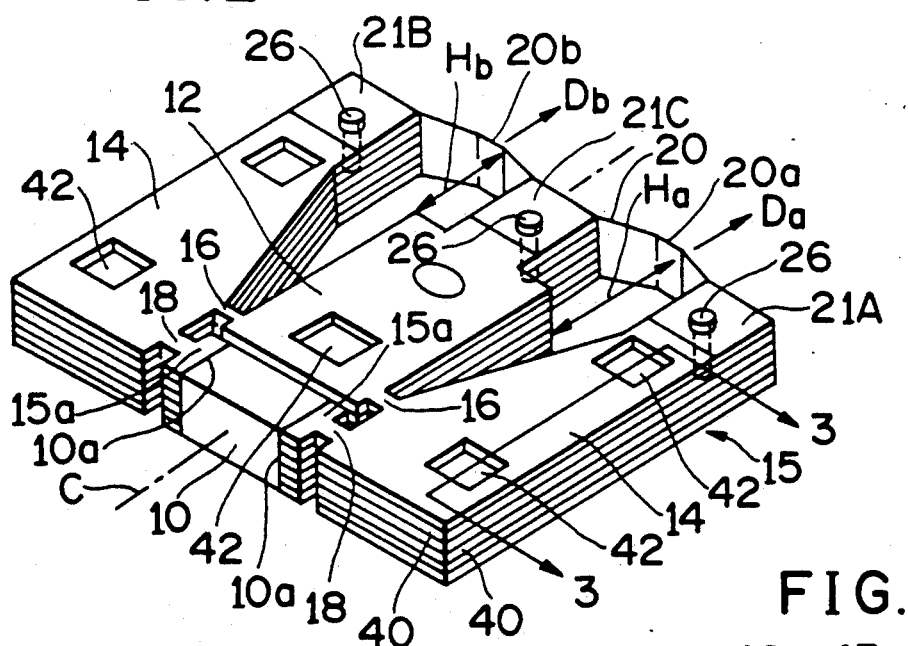
FIG. 2 is a perspective view of another displacement amplification device according to the invention, which is fundamentally similar to the device of FIG. 1 but differs in the structure of the main part.

FIG. 2 shows another embodiment of the invention. In principle, the displacement amplification device of FIG. 2 does not differ from the device of FIG. 1. The sole difference between FIG. 1 and FIG. 2 is the structure of the metal body 15 inclusive of the lever arms 14. In FIG. 1 the metal body 15 is a literally one-piece member formed by machining a metal plate, but in FIG. 2 the metal body 15 is a laminate of a plurality of pieces 40 of a thin sheet metal which is high in rigidity and usually has a thickness of 0.15-0.4 mm.

Figure 3:
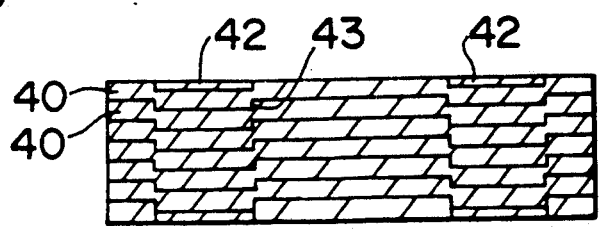
FIG. 3 is a sectional view taken along the line 3—3 in FIG. 2.

The metal pieces 40 are formed by punching the sheet metal into the plane geometry of the metal member 15. Further, to unite the metal pieces 40 into the metal member 15, each metal pieces 40 is formed with a plurality of caulking areas 42 such that each of the support part 12 and two lever arms 14 of the metal member 15 has at least one caulking area 42. As can be seen in FIG. 3 each caulking area 42 is formed by depressing the metal piece 40 so as to have a projection on the rear side. In FIG. 2 every caulking area 42 is a rectangular area, but this is not limitative. In forming each caulking area 42 the metal piece 40 is cut along limited portions of the perimeter of the area 42, e.g. along two opposite sides of a rectangular area, or discontinuously cut along the entire perimeter of the area 42. The thus worked metal pieces 40 are forcibly laminated one by one so as to fix the adjacent pieces 40 to each other by using the force of friction between the opposite side faces 43 of the coupled caulking areas 42 of the respective pieces 40.

The laminated structure of the metal body 15 in FIG. 2 is disclosed in U.S. Pat. No. 4,874,980. The one-piece metal member 15 in FIG. 1 needs to be formed by a sophisticated method such as an electro-discharge machining method, but the laminated metal member 15 in FIG. 2 can be formed by an ordinary blanking method which can easily be automated. That is, by employing the laminate structure the productivity of the metal member 15 can be improved, and the manufacturing cost can be reduced. Furthermore, the displacement amplification device can be produced with higher precision since the metal pieces 40 can be formed with high precision even though the plane geometry of the metal pieces 40 or metal member 15 is very intricate Besides, compared with the one-piece member 15 in FIG. 1 the laminated member 15 in FIG. 2 is better in the toughness or durability of the thin-walled hinge and bridge sections 16 and 18.

The function of the displacement amplification device of FIG. 2 is the same as that of the device of FIG. 1. A sample of the device of FIG. 2 was produced and tested. The material of the thin pieces 40 of the metal body 15 was a 0.4 mm thick sheet of 42Ni-Fe alloy of which the modulus of longitudinal elasticity was $14.8 \times 10^3$ kg/mm$^2$. In punching the Ni-Fe sheet into the pieces 40 with a blanking press, each piece 40 was formed with five caulking areas 42, viz, one in the support part 12 of the metal member 15 and two in each of the two lever arms 14. Every caulking area 42 was a rectangular area, and the metal sheet was discontinuously cut along the entire perimeter of the rectangular area. The total number of the metal pieces 40 was 10. The metal member 15 produced by laminating these metal pieces 40 was 4 mm in thickness, 35 mm in width and 30 mm in length. The piezoelectric element 10 and the beam 20 were identical with the counterparts in the sample of the device of FIG. 1. In the sample of the mechanism of FIG. 2 both the beam height $H_a$ and the beam height $H_b$ were 6.05 mm, and when a DC voltage of 150 V was applied to the piezoelectric element 10 both the maximal displacement $D_a$ of the segment 20a of the beam and the maximal displacement $D_b$ of the segment 20b of the beam were 0.15 mm.

Figure 4:
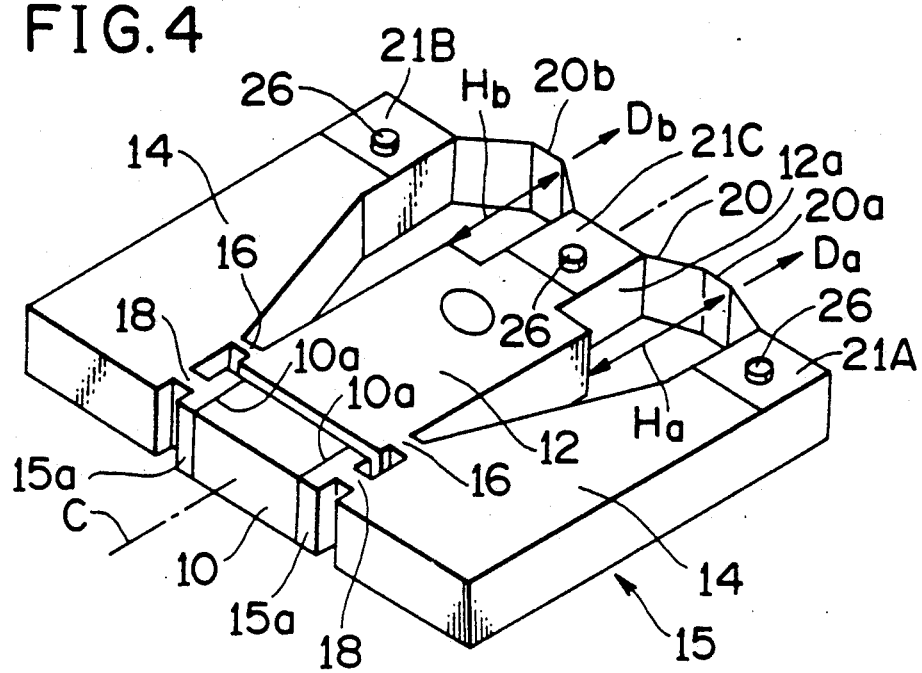
FIG. 4 shows a modification of the device of FIG. 1.

FIG. 4 shows another embodiment of the invention, which differs from the device of FIG. 1 only in the following point.

In the device of FIG. 1 the sections 20a and 20b of the beam 20 are symmetrical with respect to the center axis C of the device and identical both in length and in beam height. However, in the device of FIG. 4 the two segments 20a and 20b of the beam 20 are different in length and asymmetrical with respect to the center axis C, and the beam height $H_b$ of the section 20b differs from the beam height $H_a$ of the section 20a. Therefore, the maximal displacement $D_b$ of the segment 20b differs from the maximal displacement $D_a$ of the segment 20a. That is, the displacement amplification device of FIG. 4 simultaneously provides two outputs which are different in magnitude.

A sample of the device of FIG. 4 was produced and tested. The material of the metal member 15 was a 4 mm thick plate of the 42Ni-Fe alloy mentioned hereinbefore. The metal member 15 was 4 mm in thickness, 35 mm in width and 30 mm in length. The piezoelectric element 10 was identical with that in the sample of the device of FIG. 1. The beam height $H_a$ of the segment 20a of the beam 20 was 5.8 mm, and the beam height $H_b$ of the segment 20b was 6.2 mm. When a DC voltage of 150 V was applied to the piezoelectric element 10 the maximal displacement $D_a$ of the segment 20a of the beam (output No. 1) was 0.16 mm, and the maximal displacement $D_b$ of the segment 20b (output No. 2) was 0.12 mm.

As described above, the principal merit of the invention is that two outputs, $D_a$ and $D_b$, can simultaneously be obtained with a single displacement amplification mechanism or device. However, in mass production of a device according to the invention there is a latent possibility of a small error in the symmetry of the displacement amplifying metal member 15 with respect to the center axis C. For example, the thin-walled hinge sections 16 on the right-hand and left-hand sides might have slightly different thicknesses, and such deviation from the geometrical symmetry results in imbalance between the spring constant of the right-hand half of the metal member 15 and that of the left-hand half. When a driving voltage is applied to the piezoelectric element 10 in the slightly unsymmetrical device the displacement at the ends 10a of the piezoelectric element is more largely transmitted to one lever arm 14 which has a smaller spring constant than to the other lever arm 14, and consequently there arises an unintentional difference between the maximal displacement $D_a$ of the segment 20a of the beam 20 and the maximal displacement $D_b$ of the segment 20b even when it is intended that $D_b$ should be equal to $D_a$.

Figure 5:
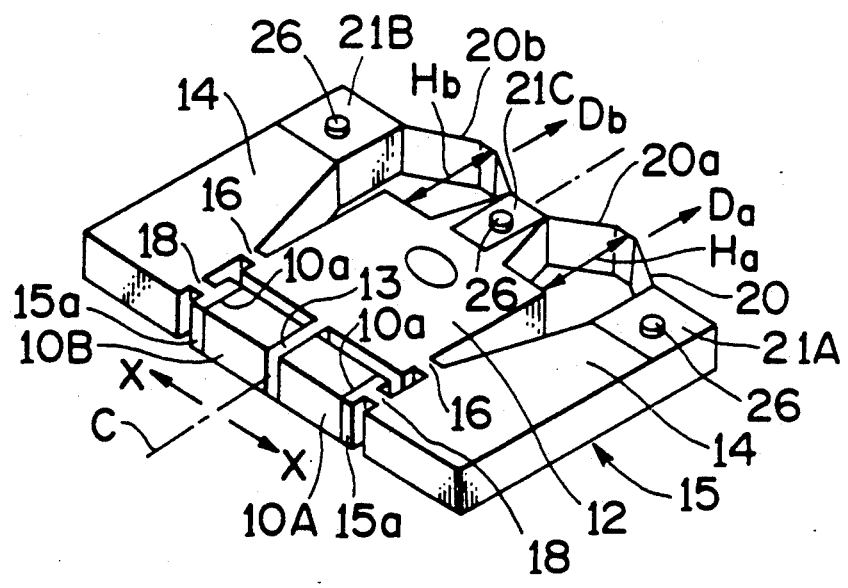
FIG. 5 shows a different modification of the device of FIG. 1.

FIG. 5 shows another embodiment of the invention, which is constructed so as to solve the above explained problem. The displacement amplification device of FIG. 5 is almost similar to the device of FIG. 1 and differs only in the following respects.

The device of FIG. 5 has two piezoelectric elements 10A and 10B which are longitudinally in alignment. The length of each of these two piezoelectric elements 10A, 10B is a half of the length of the piezoelectric element 10 in the device of FIG. 1. On the side remote from the beam 20 the support part 12 of the displacement amplifying metal member 15 has a wall-like projection 13 which will be referred to as the central holder. This central holder 13 is parallel to the two holding parts 15a of the two lever arms 14 and is located in the middle of the distance between the two holding parts 15a. That is, the central holder 13 is on the center axis C of the metal member 15. Using an adhesive, each of the two piezoelectric elements 10A and 10B is fixed at its one end to the central holder 13 and at the opposite end (10a) to one of the holding parts 15a.

In operating the displacement amplification device of FIG. 5 a driving voltage is applied to the piezoelectric element 10A, and simultaneously another driving voltage is applied to the piezoelectric element 10B. Since the central holder 13 is a stationary part the displacement at the end 10a of the piezoelectric element 10A is transmitted to only the lever arm 14 on the right-hand side, and the displacement at the end 10a of the other piezoelectric element 10B to only the lever arm 14 on the left-hand side. When the metal member 15 is accurately symmetrical with respect to the center axis C, it suffices to apply the same voltage to the both piezoelectric elements 10A, 10B to produce two outputs $D_a$, $D_b$ of the same magnitude. Even if the metal member 15 becomes somewhat unsymmetrical with respect to the center axis C by inaccuracies of manufacturing operations, still it is possible to equalize the two outputs $D_a$ and $D_b$ to each other by varying either or both of the voltages to be applied individually to the two piezoelectric elements 10A and 10B so as to compensate for the imbalance of the leverage characteristics of the two lever arms 14.

Figure 6:
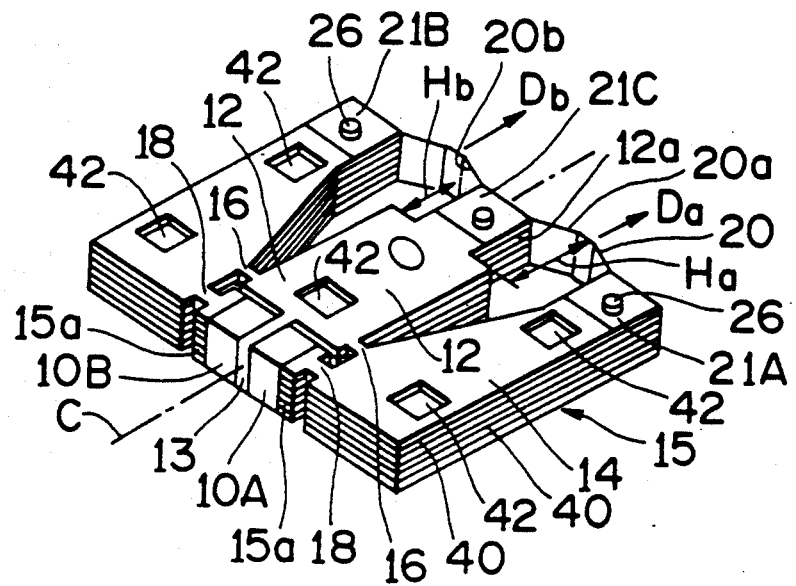
FIG. 6 shows the same modification as in FIG. 5 with respect to the device of FIG. 2.

As shown in FIG. 6, the one-piece metal member 15 of the device of FIG. 5 can be replaced by a laminate of thin metal pieces 40. Except for this change the device of FIG. 6 is similar to the device of FIG. 5. In other words, the device of FIG. 2 can be modified to the device of FIG. 6 in the same manner as the modification of the device of FIG. 1 to the device of FIG. 5.

Also it is possible to employ the above described asymmetry compensation technique in another displacement amplification device according to the invention which produces two outputs ($D_a$, $D_b$) different in magnitude as described with reference to FIG. 4.

What is claimed is:

1. A displacement amplification device, comprising:
    a displacement amplifying member which has a center axis and comprises a central support part having two thin-walled hinge sections protruding symmetrically from two opposite sides with respect to said center axis and a pair of lever arms which are arranged oppositely and symmetrically with respect to said center axis and connected to said support part by said two hinge sections, respectively, such that each of said two hinge sections becomes the fulcrum of lever action of the adjacent lever arm;
    a piezoelectric element which changes its length in the direction of a longitudinal axis thereof by application of a voltage thereto and is arranged such that said longitudinal axis is normal to said center axis of said amplifying member and fixed at one end thereof to a root end of one of said lever arms and at the opposite end to a root end of the other lever arm; and
    a beam which is made of a resilient metal sheet and is fixed at two opposite end sections thereof to tip ends of the two lever arms, respectively, and at a middle section thereof to a protruding end of said support part of said amplifying member such that each of a first segment of the beam between said middle section and one of said two opposite end sections and a second segment of the beam between said middle section and the other end section makes a buckling motion and consequently changes its distance from a reference end face of said support part of said amplifying member when a displacement of each end of said piezoelectric element is transmitted to the adjacent lever arm and amplified by lever action of the lever arm.

2. A device according to claim 1, wherein the distance of said second segment of said beam from said end face of said support part is equal to the distance of said first segment of said beam from said end face of said support part.

3. A device according to claim 1, wherein the distance of said second segment of said beam from said end face of said support part differs from the distance of said first segment of said beam from said end face of said support part.

4. A device according to claim 1, wherein said amplifying member is a one-piece member formed of a metal plate.

5. A device according to claim 1, wherein said amplifying member is a laminate of a plurality of thin pieces of the same plane geometry which are formed of a sheet metal and secured to each other by caulking.

6. A displacement amplification device, comprising:

a displacement amplifying member which has a center axis and comprises a central support part having two thin-walled hinge sections protruding symmetrically from two opposite sides with respect to said center axis, a pair of lever arms which are arranged oppositely and symmetrically with respect to said center axis and connected to said support part by said two hinge sections, respectively, such that each of said two hinge sections becomes the fulcrum of lever action of the adjacent lever arm, and a central holding part which protrudes on said center axis from a base end of said support part so as to intervene between root end sections of the two lever arms;

two piezoelectric elements each of which changes its length in the direction of a longitudinal axis thereof by application of a voltage thereto, the two piezoelectric elements being arranged longitudinally in alignment such that said longitudinal axis of the both piezoelectric elements is normal to said center axis of said amplifying member, one of the two piezoelectric elements being fixed at one end thereof to said central holding part of said amplifying member and at the opposite end to a root end of one of the two lever arms, the other piezoelectric element being fixed at one end thereof to said central holding part of said amplifying member and at the opposite end to a root end of the other of the two lever arms; and a beam which is made of a resilient metal sheet and is fixed at two opposite end sections thereof to tip ends of the two lever arms, respectively, and at a middle section thereof to a protruding end of said support part of said amplifying member such that each of a first segment of the beam between said middle section and one of said two opposite end sections and a second segment of the beam between said middle section and the other end section makes a buckling motion and consequently changes its distance from a reference end face of said support part of said amplifying member when a displacement of each end of the piezoelectric element is transmitted to the adjacent lever arm and amplified by lever action of the lever arm.

7. A device according to claim 6, wherein the distance of said second segment of said beam from said reference end face of said support part is equal to the distance of said first segment of said beam from said reference end face of said support part.

8. A device according to claim 6, wherein the distance of said second segment of said beam from said reference end face of said support part differs from the distance of said first segment of said beam from said reference end face of said support part.

9. A device according to claim 6, wherein said amplifying member is a one-piece member formed of a metal plate.

10. A device according to claim 6, wherein said amplifying member is a laminate of a plurality of thin pieces of the same plane geometry which are formed of a sheet metal and secured to each other by caulking.

* * * * *